United States Patent [19]
Mitani

[11] 3,710,699
[45] Jan. 16, 1973

[54] SINGLE LENS REFLEX CAMERA WITH AN INTERCHANGEABLE FOCUS SCREEN

[75] Inventor: Taizo Mitani, Yokohama, Japan

[73] Assignee: Cannon Kabushiki Kaisha, Tokyo, Japan

[22] Filed: April 17, 1970

[21] Appl. No.: 29,421

[30] Foreign Application Priority Data

April 21, 1967 Japan..............................44/35776

[52] U.S. Cl....................................95/10 PO, 95/42
[51] Int. Cl.................................................G01j 1/00
[58] Field of Search.......................95/42, 49, 10 PO

[56] References Cited

UNITED STATES PATENTS

| | | |
|---|---|---|
| 3,174,417 | 3/1965 | Sauer.....................................95/49 |
| 3,315,581 | 4/1967 | Ruhle.....................................95/42 |
| 3,464,339 | 9/1969 | Trankner..........................95/10 PO |
| 3,332,330 | 7/1967 | Broschke...............................95/42 |
| 3,487,760 | 1/1970 | Bretthauer............................95/42 |

*Primary Examiner*—Samuel S. Matthews
*Assistant Examiner*—Michael Harris
*Attorney*—McGlew and Toren

[57] ABSTRACT

A removeable condenser lens is mounted above the focusing screen in an SLR. The photocell must be mounted a fixed distance away from the condenser so that the condenser can swing to be removed. To compensate for any lost light which would be caused by the distance, a lens modifies to light directed at the photocell.

14 Claims, 5 Drawing Figures

PATENTED JAN 16 1973 3,710,699
FIG.1 PRIOR ART
FIG.2 PRIOR ART
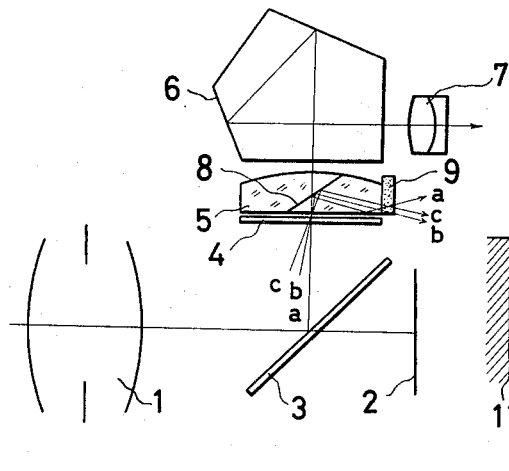
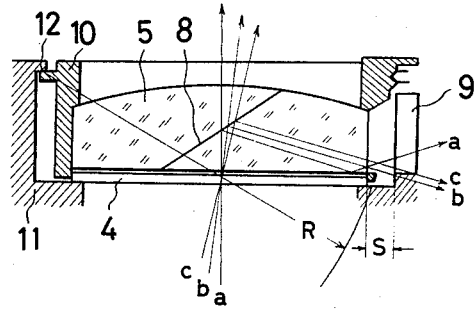
FIG.3
FIG.4
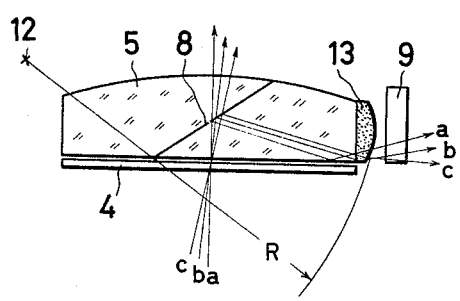
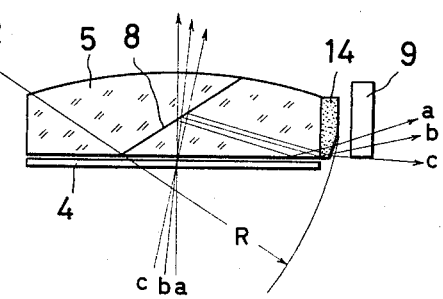
FIG.5
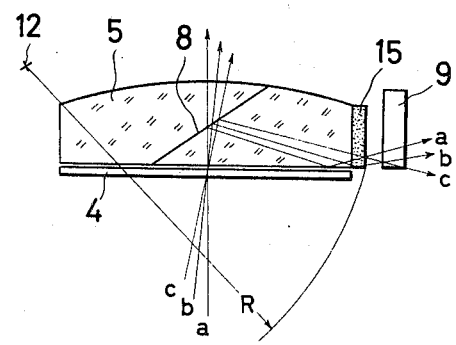
INVENTOR.
TAIZO MITANI
BY McGlew & Toren
ATTORNEYS

SINGLE LENS REFLEX CAMERA WITH AN INTERCHANGEABLE FOCUS SCREEN

In a single lens reflex camera of through-the-lens (TTL) sensing system in which a beam splitter is placed behind a focus screen thereby major portion of beams is directed to a finder and at the same time a portion of beams is directed to a sensing element located outside of a beam path for the finder, when it is desired to use a focus screen of such a type as being freely interchangeable with different kinds of screens, a possibly employed structure would be such that a sensing element is retained within a camera body, and such optical parts as a beam splitter, a condensor lens and a focus screen are integrally changed. But, in this case, because of the existence of the frame for holding a focus screen and a condensor lens and of the gap necessary for mounting and dismounting said parts, the light outlet for sensing and the sensing element are not easy to closely join together, and there is a loss in the amount of light reaching the sensing element.

Further explanation of the above will be made referring to drawings, in which:

FIG. 1 is a side elevation showing a structure of main parts in a single lens reflex camera of a through-the-lens (TTL) sensing system with a non-interchangeable type focus screen.

FIG. 2 is a side elevation showing a modified relationship between the screen mounting and dismounting mechanism and the sensing element in a conventional through-the-lens sensing type camera with an interchangeable focus screen.

FIG. 3 through FIG. 5 are side elevations of main parts of an example of the device according to the present invention.

In FIG. 1 shows, 1 is a photographing lens, 2 is a film, 3 is a mirror, 4 is a focus screen, 5 is a condensor with a beam splitter 8, 6 is a pentagonal prism, 7 is an eyepiece for a finder, the beam splitter 8 is an obliquely positioned semi-transparent mirror held within the condensor lens 5, and 9 is a sensing element, which is closely provided on a side of a condensor lens 5. In this case, supposing beams $a, b, c$ are reflected at the beam splitter 8 and enter into the sensing element 9 from different directions, parts of each of them are reflected at the beam splitter and some of the parts directly reach the sensing element, while other of the parts are totally reflected at the bottom plane of the condensor lens then reach the sensing element, thus the incident beams are all effectively utilized. Contrary to this, FIG. 2 shows the corresponding parts in a camera with an interchangeable focus screen as shown in FIG. 1, wherein there is a frame 10 to integrally hold the focus screen 4 and the condensor lens 5, and this frame 10 is so made that it can be freely mounted on and dismounted off the camera body 11. When the frame 10 is mounted or dismounted, it is pushed in or pulled up in such a rotating manner that a projection 12 which engages with an edge of one side of the frame 10 becomes a center of rotation while the lower edge of the other side rotates with a radius of R as shown in FIG. 2. In this case as the sensing element 9 is fixed to the camera body 11, it is necessary to provide an appreciable space S between the side of the condensor lens 5 and the sensing element 9 for enabling the frame 10 to be rotatably mounted and dismounted. Therefore, in this case, out of different beams $a, b, c$, which are reflected at the beam splitter 8 and are directed toward the sensing element 9, the beams $a$ and $c$ reach the sensing element, but the beam $b$ does not reach the sensing element and is lost. Thus this structure is not advantageous in this respect. In addition, there are different kinds of interchangeable focus screens such as ones having a mat surface and one having a transparent surface. Therefore their beam transmission factors are different, thus the amount of light reaching the sensing surface varies depending on the types of the focus screens used. Therefore, in a conventional device, every time the focus screen is changed, such operations as adjusting the film sensitivity, the diaphragm and the shutter speed are needed in order to meet the above variations. Such operations are not only troublesome but results in an incorrect exposure due to operator's failure in taking such operations.

The present invention is intended to eliminate such shortcomings as mentioned above in a single lens reflex camera with an interchangeable focus screen, and the features lie in that an additional member such as a condensing lens or a prism, or a simply parallel flat glass is attached to the outlet of a beam splitter for sensing, so that the beams to be sensed, which escape through the gap between the frame holding beam splitter and the sensing element, are directed toward the sensing element, and at the same time such a neutral density filter having a suitable transmission factor for compensating the amount of light transmittance in the focus screen according to the kind of screen, is used as the above-mentioned additional member.

Now, explanation shall be made on embodiments of the present invention referring to drawings.

FIG. 3 shows a device in which a condensing lens 13 is attached to an outlet side of a condensor lens 5 which also serves as a holding member for a beam splitter 8. FIG. 4 shows a device in which a prism 14 having a reduced thickness towards its lower portion is attached to the same position as mentioned in FIG. 3. These additional members should be disposed within the rotating radius R in FIG. 2, and as the additional member, a neutral density filter may be used. The density of the filter material is so determined that the amount of light reaching the sensing element is constant for the same light at all the time by adjusting the transmittance of the filter used. In this case, when a focus screen having the least amount of light transmittance among the interchangeable focus screens is used, a filter may be omitted. The filter density is gradually increased when the mount of light transmittance of the interchangeable screen becoms larger.

In the above-mentioned device such beams as $b$ in FIG. 2 are picked up by the sensing element 9 through the function of the condensing lens 13 or the prism 14, so that the loss in the amount of light for sensing is prevented, and at the same time the amount of light received by the sensing element at the replacement of the focus screen is automatically componsated with a neutral density filter having a density corresponding to the transmission factor of the focus screen 4.

FIG. 5 shows a device in which a simply parallel flat glass 15 of neutral density filter material is attached as the additional member. In this case the flat glass 15 should be naturally held within the rotating radius R, and as a result of reduction in the space S in FIG. 2, most of the beams which do not reach the sensing element are picked up. A compensating means for the interchangeable focus screens may be used as in the above-mentioned two examples.

The embodiments of the present invention which have been explained above have such effects that the loss in the amount of light due to the presence of the space between the frame holding the beam splitter and the sensing element is simply eliminated, and at the same time the difference in the amount of light received at the sensing element caused by the difference in the transmission factors of the interchangeable focus screens is automatically compensated for facilitating operation of a camera.

What is claimed is:

1. A single lens reflex camera, comprising a camera housing having an objective lens for receiving light from scenes to be photographed, a reflex mirror in the housing for directing the light received through the objective lens in a given direction, said housing forming an assembly receiving portion in the path of light from said reflex mirror, photometric means in said housing near said receiving portion, an interchangeable assembly removably set in said receiving portion, said assembly including optical transmission means in a path of substantially all the light from said reflex mirror for transmitting light in the given direction so that images of scenes being photographed can be formed, said optical transmission means including a beam splitter for directing the portion of the light from said reflex mirror in a second direction through said optical transmission means toward said photometric means, said transmission means including an exit plane through which light from the beam splitter passes, said assembly forming a gap between said exit plane and said photometric means, and optical modifying means for modifying light from said beam splitter toward said photometric means so that said photometric means receives a predetermined quantity of light in response to a given light intensity at scenes being photographed, said optical means being formed of a member attached to said transmission means and interchangeable with said assembly.

2. A camera as in claim 1, further comprising a light deflector and an eye piece assembled into a removable unit separately removable from said assembly, said removable unit being adapted to be removed before removal of said assembly.

3. A single lens reflex camera as in claim 1, wherein said member is cemented to said transmission means at the window.

4. A camera as in claim 1, wherein said member is composed of a neutral density material whose density is such as to cause said photometric means to receive a predetermined quantity of light in response to a given light intensity at a scene being photographed.

5. A camera, as in claim 1, wherein said transmission means includes a condensor lens, said beam splitter being formed within said condensor lens, said exit plane being formed at the edge of said condensor lens.

6. A camera, as in claim 1, wherein said member has a different optical transmission characteristic than that of said transmission means.

7. A single lens reflex camera, comprising camera housing means and interchangeable viewer means adapted to be mounted on the housing and removed therefrom; said camera housing means including objective lens means for receiving light, and reflex means movable into the path of the light from said objective for directing the light toward said viewer means when said viewer means is mounted in the housing; said viewer means including a screen and optical means for directing the light to a viewer; said housing means including photoelectric means spaced from said optical means, said optical means including beam splitter means for directing a portion of the light from said mirror towards said photoelectric means, said optical means having an exit face through which light from said beam splitter means passes, said photoelectric means being spaced from said viewer means at the exit face and light restricting means mounted on one of said and said photoelectric means for limiting the egress of light from the path between said viewer means and said photoelectric means, said restricting means including an optical element having interiorly reflecting surfaces and mounted on said viewer means and extending toward said optical means to close the space between said viewer means, said member covering substantially the entire exit face.

8. A camera as in claim 7, wherein said element has a different optical transmission characteristic than that of said optical means.

9. A camera as in claim 7, wherein said restricting means forms a light filter for limiting the intensity of light to said photoelectric means.

10. A camera as in claim 7, wherein said restricting means forms light filter means for complementing the light passing therethrough with the light passing through the screen.

11. A camera as in claim 7, wherein said element includes a prismatic surface.

12. A camera as in claim 7, wherein said element includes an interior surface extending parallel to the path.

13. A viewing apparatus for a camera having a housing and a mirror for redirecting light passing through an objective to the viewing apparatus and photoelectric means on the housing spaced from the apparatus, comprising a screen and optical means for directing the light to a viewer, said optical means including beam splitter means for directing a portion of the light from said mirror means toward said photoelectric means, and light restricting means mounted on said optical means for preventing light from said beam splitter means to said photoelectric means from escaping out of the space between said optical means and said photoelectric means and for directing the light between said beam splitter means and said photoelectric means, said restricting means including an interiorly reflective member occupying a portion of the space formed between said optical means and said photoelectric means when the apparatus is mounted on the camera, said optical means having an exit face remote from the beam splitter means and said member covering substantially the entire exit face so as to transmit virtually all light therefrom.

14. An apparatus as in claim 13, wherein said member includes an interiorly reflecting portion parallel to a path between said beam splitter means and the photoelectric means when the apparatus is mounted.

* * * * *

UNITED STATES PATENT OFFICE
CERTIFICATE OF CORRECTION

Patent No. 3,710,699          Dated January 16, 1973

Inventor(s)   Taizo Mitani

It is certified that error appears in the above-identified patent and that said Letters Patent are hereby corrected as shown below:

In the heading of the patent:

The name of the assignee should read:

--Canon Kabushiki Kaisha--.

Signed and sealed this 17th day of September 1974.

(SEAL)
Attest:

McCOY M. GIBSON JR.                C. MARSHALL DANN
Attesting Officer                  Commissioner of Patents